(12) United States Patent
Rahim

(10) Patent No.: US 10,858,901 B1
(45) Date of Patent: Dec. 8, 2020

(54) REMOTELY OPERATED CONNECTING ASSEMBLY AND METHOD

(71) Applicant: Shazam Rahim, Broussard, LA (US)

(72) Inventor: Shazam Rahim, Broussard, LA (US)

( * ) Notice: Subject to any disclaimer, the term of this patent is extended or adjusted under 35 U.S.C. 154(b) by 183 days.

(21) Appl. No.: 16/279,444

(22) Filed: Feb. 19, 2019

Related U.S. Application Data

(60) Provisional application No. 62/632,626, filed on Feb. 20, 2018.

(51) Int. Cl.
| | | |
|---|---|---|
| *E21B 33/03* | (2006.01) | |
| *E21B 34/02* | (2006.01) | |
| *F16L 37/10* | (2006.01) | |
| *F16L 37/62* | (2006.01) | |
| *E21B 47/06* | (2012.01) | |

(52) U.S. Cl.
CPC .............. *E21B 33/03* (2013.01); *F16L 37/10* (2013.01); *F16L 37/62* (2013.01); *E21B 34/02* (2013.01); *E21B 47/06* (2013.01)

(58) Field of Classification Search
CPC .......... E21B 33/03; E21B 34/02; E21B 47/06; E21B 33/0353; E21B 33/038; F16L 37/10; F16L 37/62
See application file for complete search history.

(56) References Cited

U.S. PATENT DOCUMENTS

| | | | |
|---|---|---|---|
| 2,962,096 A | 11/1960 | Knox | |
| 3,608,932 A | 9/1971 | Brown | |
| 3,667,721 A * | 6/1972 | Vujasinovic | F02F 1/22 251/1.1 |
| 3,874,706 A * | 4/1975 | Arnold | F16L 25/12 285/24 |
| 4,057,267 A * | 11/1977 | Jansen, Jr. | F16L 37/002 285/18 |
| 4,667,986 A | 5/1987 | Johnson et al. | |
| 4,673,041 A | 6/1987 | Turner et al. | |
| 4,730,853 A | 3/1988 | Gjessing | |
| 5,107,931 A * | 4/1992 | Valka | E21B 33/035 166/342 |
| 5,114,117 A | 5/1992 | Appleford et al. | |
| 5,279,369 A | 1/1994 | Brammer | |
| 6,609,572 B1 * | 8/2003 | Andersen | E21B 33/038 166/338 |
| 7,267,179 B1 | 9/2007 | Abel | |
| 7,334,634 B1 | 2/2008 | Abel | |
| 7,383,887 B1 | 6/2008 | Abel | |
| 7,464,751 B1 | 12/2008 | Abel | |
| 7,740,061 B2 | 6/2010 | Van Bilderbeek et al. | |
| 9,068,423 B2 * | 6/2015 | Johnson | E21B 33/038 |

(Continued)

OTHER PUBLICATIONS

Lee Specialties "Quick Test Sub" 2012 Catalog "Quick Test Sub Catalog").

*Primary Examiner* — Daniel P Stephenson
(74) *Attorney, Agent, or Firm* — Jones Walker LLP

(57) ABSTRACT

A connecting assembly for quick and safe securing of equipment or tools to a wellhead or for connection between wellbore equipment such as wireline tools or coiled tubing tools. The connecting assembly has a top sub that includes a latching assembly containing a hydraulically actuated locking ring and a mechanically actuated locking segment that selectively engages within the bottom sub to operatively connect the bottom sub within the top sub in sealing engagement.

33 Claims, 15 Drawing Sheets

(56) References Cited

U.S. PATENT DOCUMENTS

| | | | |
|---|---|---|---|
| 9,416,894 B2 | 8/2016 | Abel | |
| 9,869,148 B2 * | 1/2018 | Jahnke | F16L 37/002 |
| 9,879,496 B2 | 1/2018 | Johansen et al. | |
| 10,012,044 B2 * | 7/2018 | Leba | E21B 21/08 |
| 10,030,461 B2 | 7/2018 | Johansen et al. | |
| 10,323,484 B2 * | 6/2019 | Liess | E21B 3/02 |
| 10,794,137 B2 * | 10/2020 | Kibler | E21B 47/06 |
| 2010/0101805 A1 * | 4/2010 | Angelle | E21B 19/16 |
| | | | 166/380 |
| 2010/0155074 A1 * | 6/2010 | Rodriguez | E21B 33/038 |
| | | | 166/341 |
| 2011/0284206 A1 | 11/2011 | Nguyen | |
| 2012/0012341 A1 | 1/2012 | White et al. | |
| 2014/0332703 A1 * | 11/2014 | Paradise | F02C 7/232 |
| | | | 251/89 |
| 2015/0083430 A1 * | 3/2015 | Jahnke | E21B 33/03 |
| | | | 166/338 |
| 2017/0067320 A1 * | 3/2017 | Zouhair | E21B 41/00 |
| 2018/0051527 A1 * | 2/2018 | Scekic | E21B 19/166 |
| 2019/0048678 A1 * | 2/2019 | Ross | E21B 33/03 |
| 2019/0390528 A1 * | 12/2019 | Angers, Jr. | E21B 23/02 |
| 2020/0141196 A1 * | 5/2020 | Young | E21B 34/14 |

\* cited by examiner

REMOTELY OPERATED CONNECTING ASSEMBLY AND METHOD

CROSS-REFERENCE TO RELATED APPLICATIONS

This application claims the benefit of and priority to U.S. Provisional Patent Application No. 62/632,626 filed on Feb. 20, 2018, which is incorporated herein by reference.

BACKGROUND OF THE DISCLOSURE

The disclosure relates to a remotely operated connecting assembly for a wellhead or for connection between wellbore equipment.

SUMMARY OF THE DISCLOSURE

The connecting assembly disclosed herein is configured for quick and safe securing of equipment or tools to a wellhead. The connecting assembly also provides for quick and safe connection between wellbore equipment such as wireline tools or coiled tubing tools. The connecting assembly may be used in connection with wellbore completion or fracturing operations.

The connecting assembly includes a bottom sub that may attach to the top of the wellhead. Alternatively, the bottom sub may attach to a first wireline or coiled tubing tool desired to be operatively connected to a second wireline tool or coiled tubing tool. The connecting assembly further includes a top sub operatively associated with wellhead equipment such as wireline or coiled tubing tools. The top sub contains a connecting mechanism that remotely affixes, in operative arrangement, the top sub to the bottom sub thereby providing a working connection between the wellhead equipment and the wellhead or between the wireline tools or coiled tubing tools. The connecting mechanism includes mechanically actuated locking segments that secure the bottom sub within the top sub. Four mechanically actuated locking segments may be provided. Each locking segment may contain a locking pin in operative arrangement with a locking ring. The locking segments have a non-activated position and an activated position. The locking segments are mechanically moved via the locking pins from a non-activated to an activated position.

In the non-activated position, the locking pins and attached locking segments are placed in a non-engaged arrangement with respect to the bottom sub. In the activated position, the locking pins and the attached locking segments are placed in an engaged arrangement with respect to the bottom sub. Rotation of the locking ring radially moves the locking pins and attached locking segments either from the non-activated position to the activated position or from the activated position to the non-activated position. Rotation of the locking ring may be achieved by hydraulic actuation of locking ring actuating means. The locking ring actuating means may comprise a hydraulically activated piston operatively associated with the locking ring. The mechanical placement of the locking pins and locking segments in the activated position, whereby the locking segments engage the bottom sub, provides a positive lock and ensures that hydraulic failure will not cause the locking ring to move from the activated position that engages the bottom sub. The positive locking function is achieved by the configuration of the apertures or recesses within the locking ring into which the locking pins are disposed. The configuration provides a camming action whereby the locking pins are positively engaged within the camming portion of the recesses so as to mechanically hold the locking ring in a stationary and activated position in the event hydraulic force is lost or diminished.

The connecting assembly is operated remotely by rig personnel so that there is no need for the personnel to be physically present within the "red zone" area around the wellhead (within 100 feet from the wellhead). A control unit may be operated by the personnel to activate the locking ring actuating means to move the locking ring from the non-activated position to the activated position whereby the locking segments are radially placed into engagement with the bottom sub. The control unit includes hydraulic lines operatively connected to the connecting assembly.

The connecting assembly provides for locking segments (e.g., four segments) that remotely close together to create a positive lock. A safety lock is provided to ensure that the locking segments remain engaged in the event of hydraulic failure.

The connecting assembly may include a wellbore pressure sensor.

The connecting assembly may include a hydraulic safety bypass valve that prevents disconnection of the connecting assembly while under wellbore pressure.

The connecting assembly may include a quick test port.

The connecting assembly may include a reentry guide for wireline or other tools.

The connecting assembly may include a manual override system to disengage the positive lock created by the locking ring and locking pins in the case of a hydraulic failure.

The apertures within the locking ring may be configured to provide a camming action as the locking ring moves from the non-activated position to the activated position with regard to the locking pin placement. The camming action provides for the positive lock when the locking ring is in the activated position preventing disengagement of the locking segments from the bottom sub. For example, the curvature of the apertures in the locking ring is configured to mechanically and positively retain the locking ring in a stationary and activated position even in the event of hydraulic failure.

The connecting assembly may include four locking pins operatively associated with the locking ring (disposed therethrough). The connecting assembly may also include two hydraulic locking ring actuating means (two hydraulic cylinders with pistons) to move the locking ring from the non-activated position to the activated position.

The connecting assembly is configured such that when stabbing the top sub onto the bottom sub, the O-rings positioned in the upper section of the bottom sub are protected from physical contact so that there is no damage to the O-rings during connection operations.

The connecting assembly may be used for well completion, fracturing, coiled tubing operations, and/or wireline operations.

The connecting assembly may be configured so that it may be operated with hydraulic force in the range of 800 to 1000 psi to move the locking ring from the non-activated position to the activated position.

The connecting assembly operatively connects the top sub to the bottom sub by stabbing and without rotation of either the top sub or the bottom sub.

An embodiment of the connecting assembly disclosed herein may include a top sub including a housing with an interior bore wall. The housing may include an upper section, a middle section, and a lower section. The upper section may be configured for detachable fixation to a first wellbore tool. The middle section may include a latching assembly. The lower section may include a guide member.

The embodiment may also include a bottom sub having a mandrel and a connecting nut. The mandrel may include an upper section with one or more seals, a first shoulder and a second shoulder spaced apart by a locking segment receipt section, and a lower section including a third shoulder. The lower section may be configured for detachable fixation to the connecting nut. The connecting nut may include an upper section detachably affixed to the lower section of the mandrel and a lower section configured for detachable fixation to a wellhead or to a second wellbore tool. The mandrel and connecting nut made both include an internal bore in communication.

In one embodiment, the guide member may have an upper section affixed to the lower section of the housing and a lower section configured to receive the upper section of the mandrel when the top sub is stabbed onto the bottom sub. The lower section of the guide member may have an enlarged inner diameter in relation to the inner diameter of the upper section of the guide.

In another embodiment, the latching assembly may include a compartment containing a locking ring having a top surface, a bottom surface, and an interconnecting side surface. The side surface may include a plurality of L-shaped recesses terminating in a shoulder. The locking ring may include a plurality of apertures extending from the top surface to the bottom surface.

In a further embodiment, the latching assembly may include a plurality of locking segments within the compartment. Each of the plurality of locking segments may include a vertically extending locking pin. Each locking pin may be disposed through one of the plurality of apertures in the locking ring.

In yet another embodiment, the latching assembly may further include one or more locking ring actuating assemblies positioned on the compartment and extending therein. Each of the one or more locking ring actuating assemblies may include a hydraulically actuated cylinder and a piston. The piston may include a distal end operatively connected to the shoulder of the locking ring such that hydraulic actuation of the locking ring actuating assemblies causes the locking ring to selectively rotate from a first non-activated position to a second activated position and from the second activated position to the first non-activated position.

In another embodiment, when the top sub has been stabbed onto the bottom sub and the locking ring actuating assemblies have been rotated from the first non-activated position to the second activated position, the rotation of the locking ring actuating assemblies causes the locking pins and attached locking segments to radially move to a position wherein the locking segments are engaged within the locking segment receipt section of the mandrel to operatively connect the bottom sub within the top sub in sealing engagement.

In a further embodiment, the plurality of apertures comprise a top portion and a bottom portion, wherein the locking pins are disposed at the top portion of the aperture in the first non-activated position, and the locking pins are disposed at the bottom portion of the aperture in the second activated position. The bottom portion of each aperture may be spatially closer to the housing than the top portion of each aperture.

In a further embodiment, wherein a second rotation of the locking ring actuating assemblies causes the locking pins and attached locking segments to radially move to a second position wherein the locking segments that are engaged within the locking segment receipt section are disengaged within the locking segment receipt section of the mandrel to operatively disconnect the bottom sub from the sealing engagement within the top sub.

In a further embodiment, the guide member has a tapered shape from the enlarged inner diameter of the lower section of the guide member to the inner diameter of the upper section of the guide member.

In a further embodiment, an outer side surface of the locking ring contains one or more cutouts, each cutout configured to receive a corresponding one of the pistons.

In a further embodiment, the connecting assembly may further include one or more cylinder guard assemblies connected to top and bottom portions of the compartment.

In a further embodiment, each cylinder guard assembly is affixed to the top and bottom portions of the compartment via attachment means.

In a further embodiment, each cylinder guard assembly is integrally formed with the top and bottom portions of the compartment.

In a further embodiment, each cylinder guard assembly is configured to house one of the hydraulically actuated cylinders and one of the pistons.

In a further embodiment, the guide member comprises a reentry guide assembly configured to receive a wireline tool.

In a further embodiment, the locking pins are coupled to locking segment assemblies that extend outward from the housing in a radial direction.

In a further embodiment, the connecting assembly may further include a control unit configured to activate the locking ring actuating assemblies to move the locking ring from the first non-activated position to the second activated position.

In a further embodiment, the control unit comprises one or more hydraulic lines operatively connected to the connecting assembly and the activation is via the one or more hydraulic lines.

In a further embodiment, the connecting assembly may further include a wellbore pressure sensor configured to provide a pressure measurement associated with the internal bore.

In a further embodiment, the rotation of the locking actuating assemblies is responsive to hydraulic force inside the internal bore in the range of about 800 to about 1000 psi to move the locking ring from the non-activated position to the activated position.

In a further embodiment, the connecting assembly may further include one or more O-rings disposed on the upper outer surface of the mandrel.

In a further embodiment, the mandrel comprises one or more recesses each configured to receive placement of a corresponding one of the one or more O-rings.

In a further embodiment, the one or more O-rings sealingly engage with the interior bore wall of the top sub housing when the top sub is stabbed onto the bottom sub.

In a further embodiment, the one or more O-rings comprise two O-rings, and the connecting assembly further comprises a quick test assembly coupled to an outer surface of the housing in operative communication with a test port extending through the housing and positioned between the two O-rings, wherein the quick test assembly is configured to indicate an adequate sealing connection of the bottom sub within the top sub.

In a further embodiment, the nut includes a sleeve situated on an inner surface of the nut and placed within the internal bore.

In a further embodiment, the sleeve is connected to the inner surface of the nut via connecting means.

In a further embodiment, the sleeve is a split ring assembly.

In a further embodiment, the connecting assembly may further include a safety bypass valve assembly positioned on and within the upper section of the housing of the top sub, wherein the safety bypass value assembly is configured to prevent dislodging of the locking segments from the locking segment receipt stations while there is wellbore pressure within the inner bore wall.

In a further embodiment, the connecting assembly may further include a protection assembly positioned about the safety bypass valve assembly.

In a further embodiment, the compartment further includes a manual override assembly configured to disengage the locking segments engaged within the locking segment receipt section of the mandrel to operatively disconnect the bottom sub from the sealing engagement within the top sub in the case of a hydraulic failure.

In a further embodiment, the manual override assembly disengages the locking segments by disengaging a locking mechanism between the locking ring and the locking pins.

In a further embodiment, the connecting assembly further includes a hydraulic manifold assembly connected to the housing, wherein the hydraulic manifold assembly includes an entry line and an exit line for hydraulic fluid, and the hydraulic manifold assembly further includes one or more valves for controlling a flow, a pressure, or a backflow of the hydraulic fluid.

In a further embodiment, when in the second activated position, the locking ring maintains the operative connection of the bottom sub within the top sub in sealing engagement despite a loss of hydraulic force.

In a further embodiment, the connecting assembly further includes an adapter configured to interconnect to the top section of the housing to the wellbore tool.

The disclosure also relates to a method for operating a connecting assembly. The method may include the steps of providing the connecting assembly as described herein above. The method may include the steps of stabbing the top sub onto the bottom sub, and causing, responsive to the stabbing, rotation of the locking ring from the first non-activated position to the second activated position and from the second activated position to the first non-activated position by causing rotation of the locking ring actuating assemblies to cause the locking pins and attached locking segments to radially move to a position wherein the locking segments are engaged within the locking segment receipt section of the mandrel to operatively connect the bottom sub within the top sub in sealing engagement.

In a further embodiment, the method may include the step of causing a second rotation of the locking ring actuating assemblies to cause the locking pins and attached locking segments to radially move to a second position wherein the locking segments that are engaged within the locking segment receipt section are disengaged within the locking segment receipt section of the mandrel to operatively disconnect the bottom sub from the sealing engagement within the top sub.

DETAILED DESCRIPTION OF THE DISCLOSURE

Figure 1:
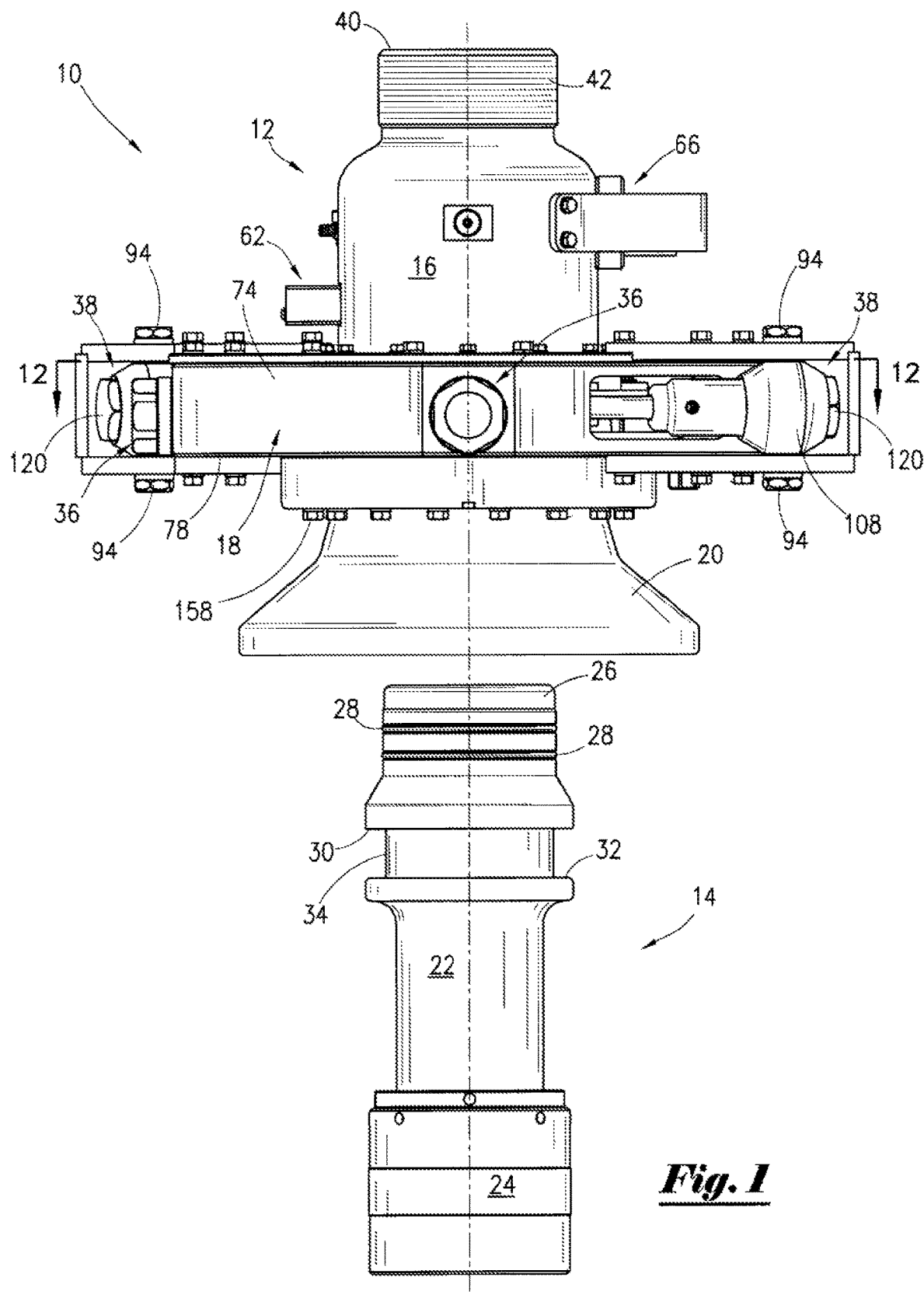
FIG. 1 is a side view of the connecting assembly with the top sub positioned in a pre-stabbing arrangement over the bottom sub.
Figure 2:
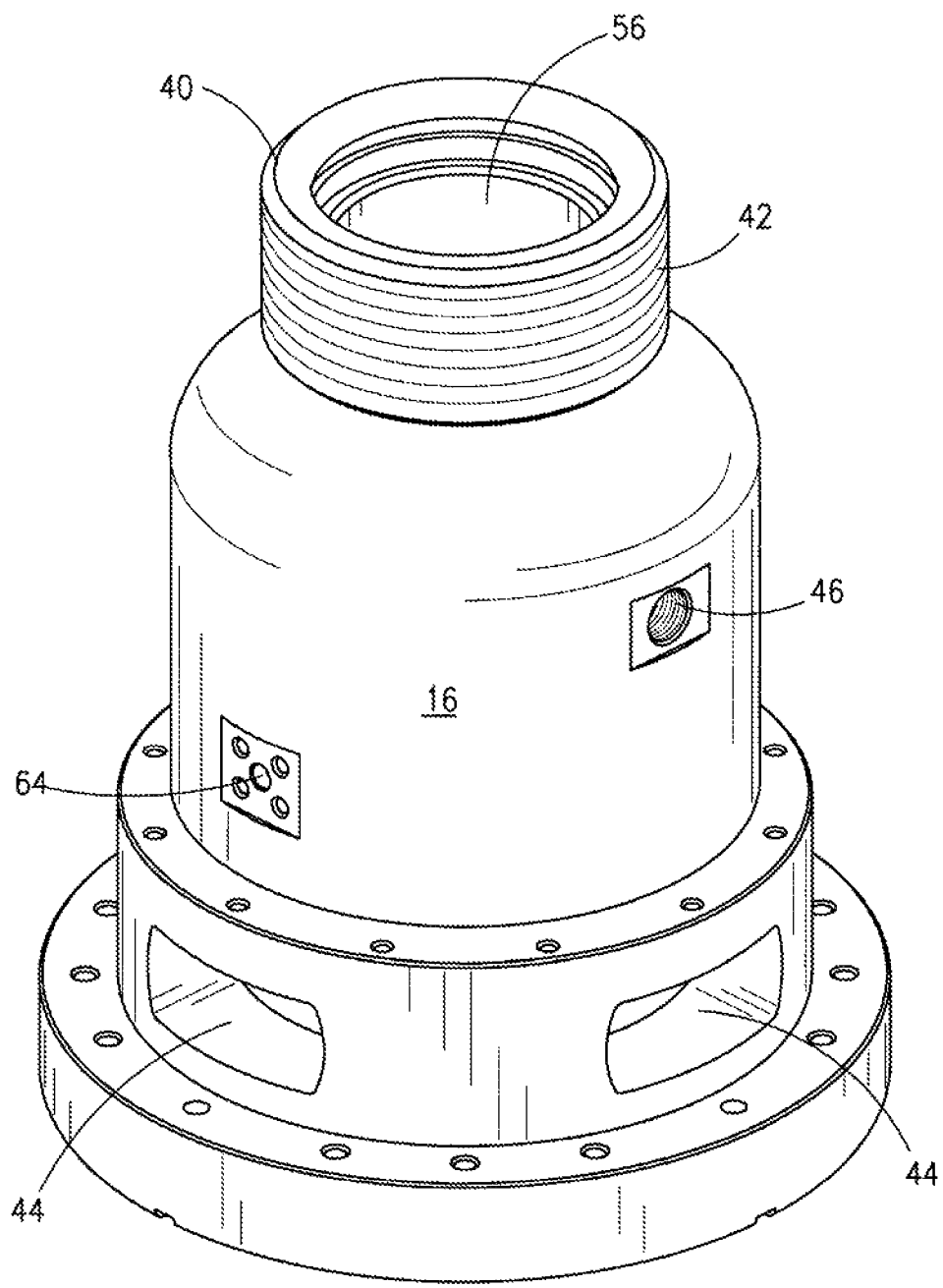
FIG. 2 is an isomeric view of the top sub of the connecting assembly.
Figure 3:
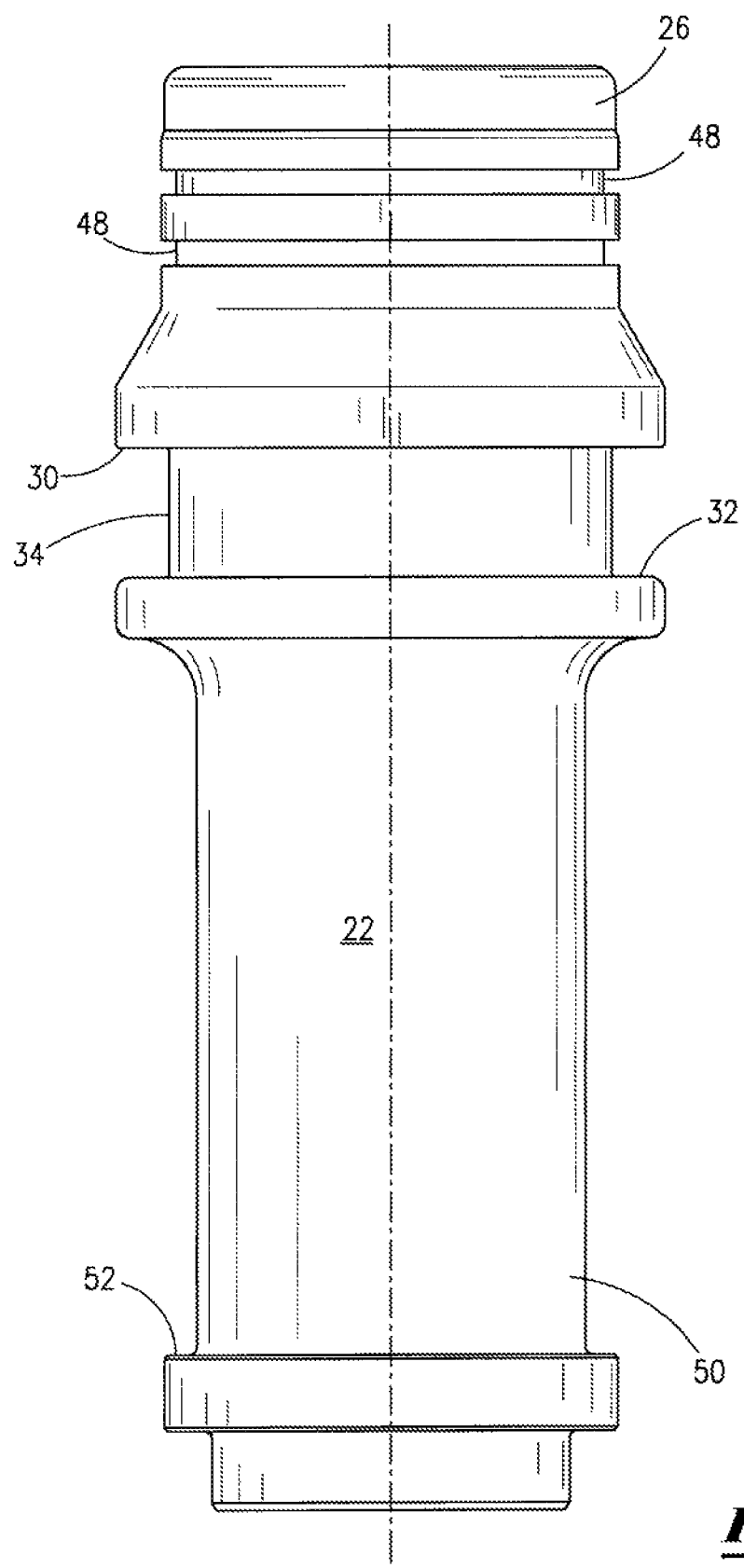
FIG. 3 is a side view of the bottom sub of the connecting assembly.
Figure 4:
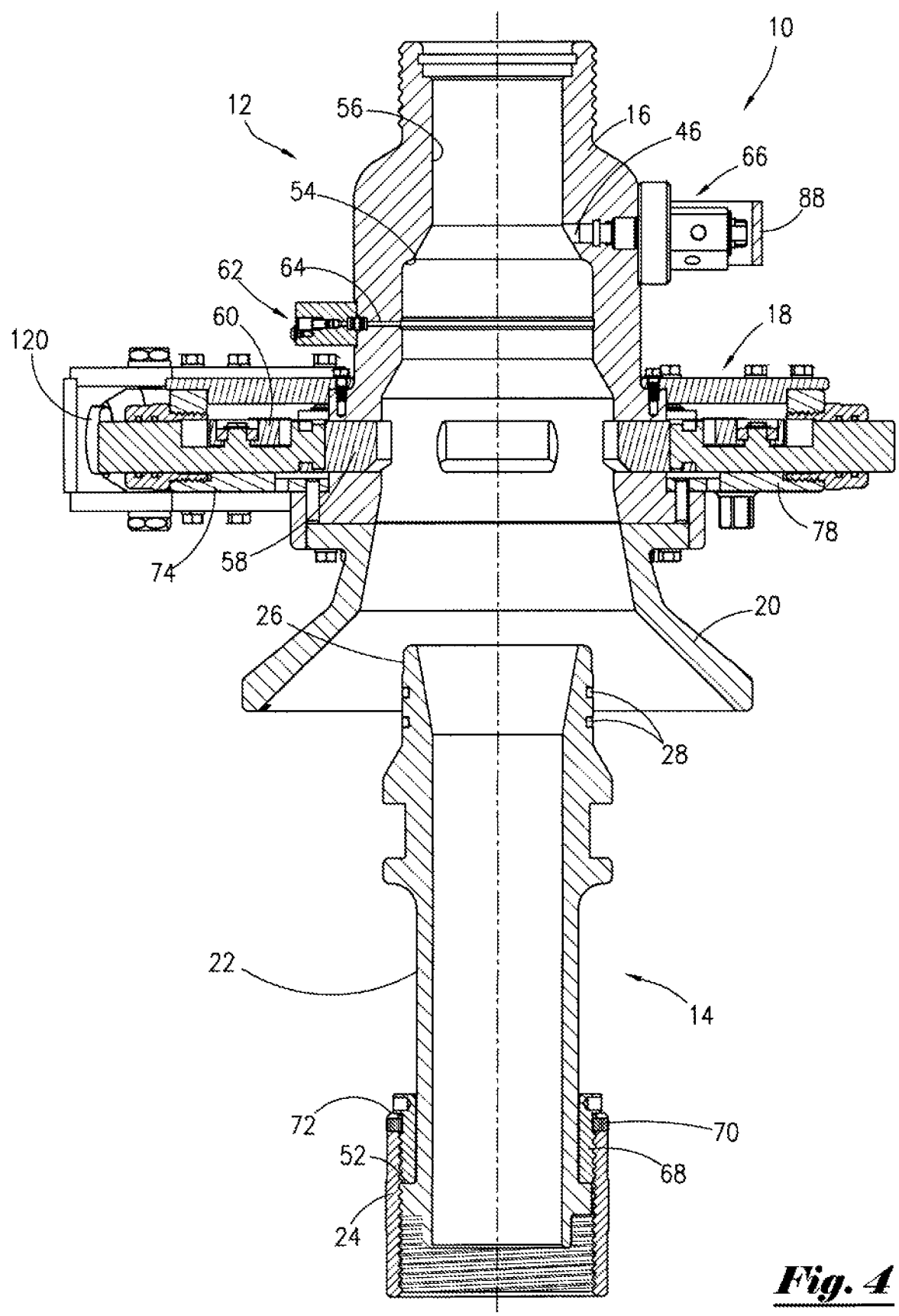
FIG. 4 is a cross-sectional view taken through line 12-12 of the connecting assembly of FIG. 1 with the top sub positioned in a partially stabbing arrangement with the bottom sub.

With reference to the figures where like elements have been given like numerical designation to facilitate an understanding of the present disclosure, and particularly with reference to the embodiment of the connecting assembly illustrated in FIGS. 1-3, connecting assembly 10 may include top sub 12 and bottom sub 14. As shown, top sub 12 is positioned above bottom sub 14 as would be typical when top sub 12 is being stabbed onto bottom sub 14 in order to connect top sub 12 to bottom sub 14. Although not shown, in some embodiments bottom sub 14 may be operatively connected to a wellhead, and top sub 12 may be operatively connected to a tool or other equipment used in wellbore operations. In some embodiments, bottom sub 14 may be operatively connected to a first wireline tool or coiled tubing tool, and top sub 12 may be operatively connected to a wireline tool or coiled tubing tool, such as a wireline lubricator.

Again with reference to FIGS. 1-3, top sub 12 may include body or housing 16, latching assembly 18, and guide member 20. In some embodiments, guide member 20 is tapered and has an enlarged diameter section at its bottom end for receipt, during stabbing, of bottom sub 14. In some embodiments, the lower section of the guide member 20 may have an enlarged inner diameter in relation to the inner diameter of the upper section of the guide member 20. The internal diameter of housing 16 is configured to accommodate the outer diameter of bottom sub 14 in sealing arrangement.

The upper or top section 40 of housing 16 may be detachably fixed to a first wellbore tool, the middle section of housing 16 may include the latching assembly 18, and the lower section of housing 16 may include the guide member 20. The guide member 20 may have an upper section affixed (e.g., via screws 158) to the lower section of the housing 16 and have a lower section configured to receive the upper section 26 of mandrel 22 when the top sub 12 is stabbed onto the bottom sub 14.

With further reference to FIGS. 1-3, bottom sub 14 may include mandrel 22 and connecting nut 24. The upper outer surface section 26 of mandrel 22 may include detachably connected O-rings 28 that may sealingly engage with the inner diameter surface of housing 16 when bottom sub 14 is operatively positioned within top sub 12 (i.e., in a stabbing configuration). Mandrel 22 may also include shoulders 30 and 32 spaced apart between locking segment receipt section 34. Mandrel 22 and nut 24 form an internal bore which communicates with an internal bore of top sub 12 when connected together. Nut 24 may contain internal threads in its bottom section for threaded connection to the wellhead or to a wireline or coiled tubing tool.

As seen in FIGS. 1-3, latching means 18 may include mechanical locking segment assemblies 36. For example, four locking segment assemblies 36 may be positioned or spaced equidistantly around housing 16. The locking segment assemblies 36 may extend outward from the housing 16 in a radial direction. Latching means 18 may also include hydraulic locking ring actuating means 38. For example, two hydraulic locking ring actuating means 38 may be provided in association with housing 16.

Again, with reference to FIGS. 1-3, housing 16 may contain external threads 42 at top section 40. Threads 42 may mate with cooperating threads on the tool to which top sub 12 may be connected.

FIG. 2 shows housing 16 with an inner bore wall 56 through housing 16 and shows the threads 42 at the top section 40. Apertures 44 in housing 16 provide access for locking segment assemblies 36. Access port 46 receives hydraulic safety bypass valve assembly 66 (not shown). Test port 64 may extent through the housing 16 and may operate with a quick test assembly 62 (not shown) to test a sealing connection of bottom sub 14 and top sub 12 when in a stabbing configuration. In some embodiments, the top section 40 may have a ring 150 (e.g., rubber, polymer, and the like) disclosed inside the top surface adjacent to the inner surface of the top section 40 and may rest upon an inner shoulder. Ring 150 (FIG. 14) may help to secure tool and adapter attachments to the top section 40.

FIG. 3 illustrates mandrel 22 of bottom sub 14. Mandrel 22 may include recesses 48 in upper section 26 for placement of O-rings 28 (not shown). Mandrel 22 may also include bottom section 50. Bottom section 50 may include shoulder 52 that receives and contains a sleeve 68 (not shown) within nut 24 when bottom section 50 is operatively positioned within nut 24. Connecting nut 24 (not shown) may include an upper section detachably affixable to the lower section 50 of the mandrel 22 and a lower section configured for detachable fixation to a wellhead or to a second wellbore tool. According to some aspects, the mandrel 22 and connecting nut 24 both include an internal bore in communication.

Figure 5:
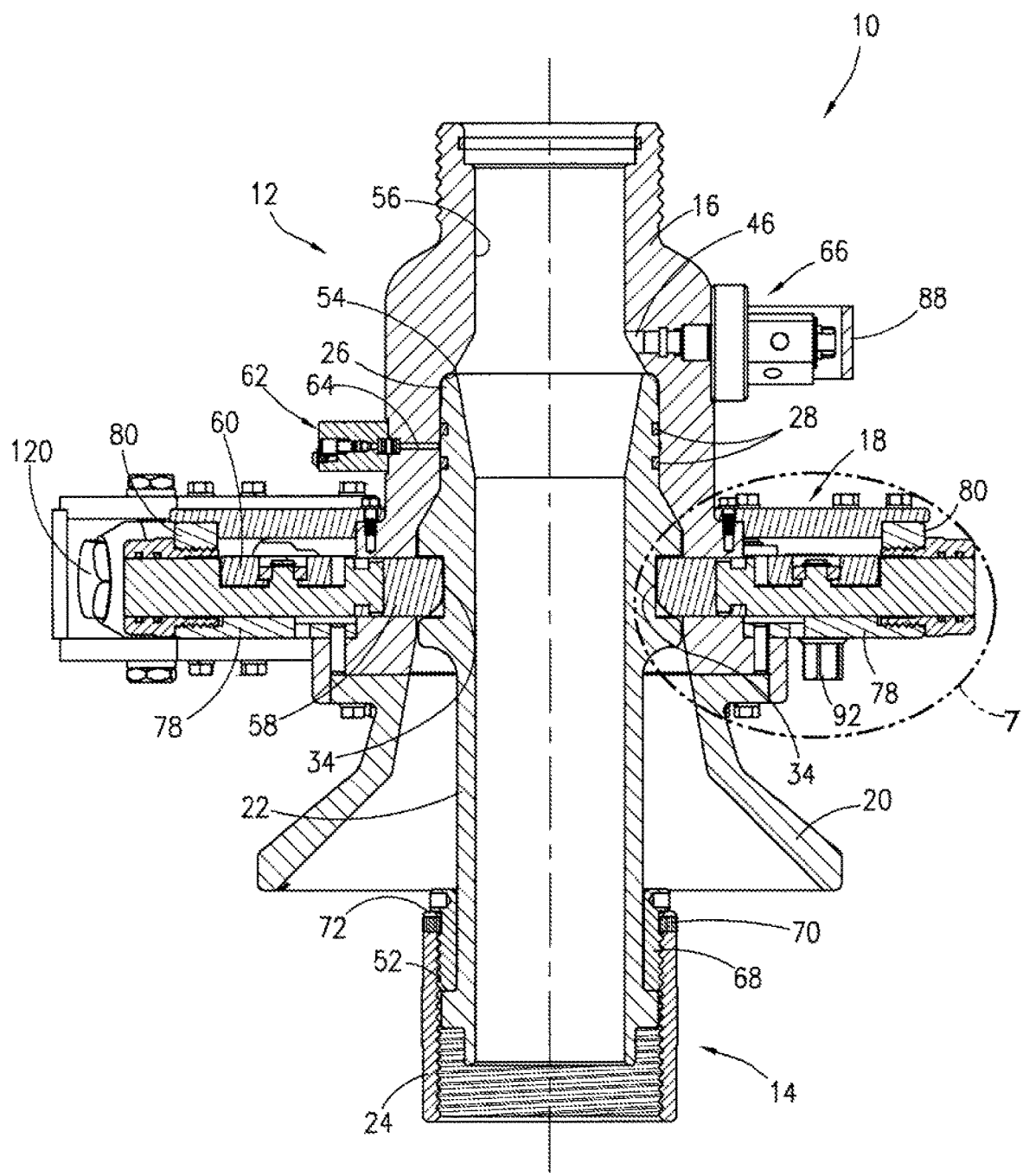
FIG. 5 is a cross-sectional view taken through line 5-5 of the connecting assembly of FIG. 9 with the top sub positioned in fully stabbing arrangement with the bottom sub.
Figure 6:
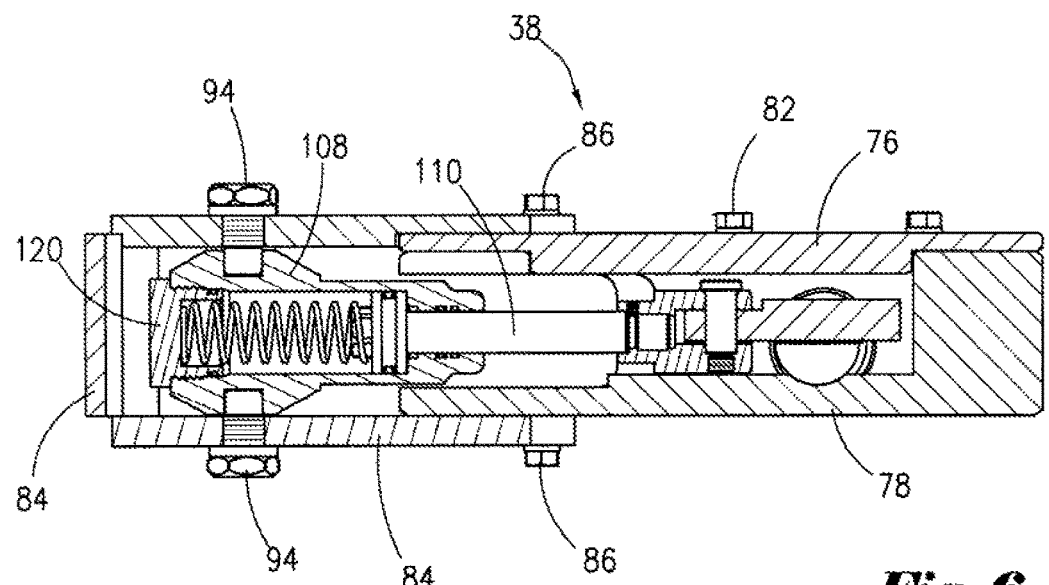
FIG. 6 is a cross-sectional view of the hydraulic locking ring actuating means of the connecting assembly shown in FIG. 5.
Figure 7:
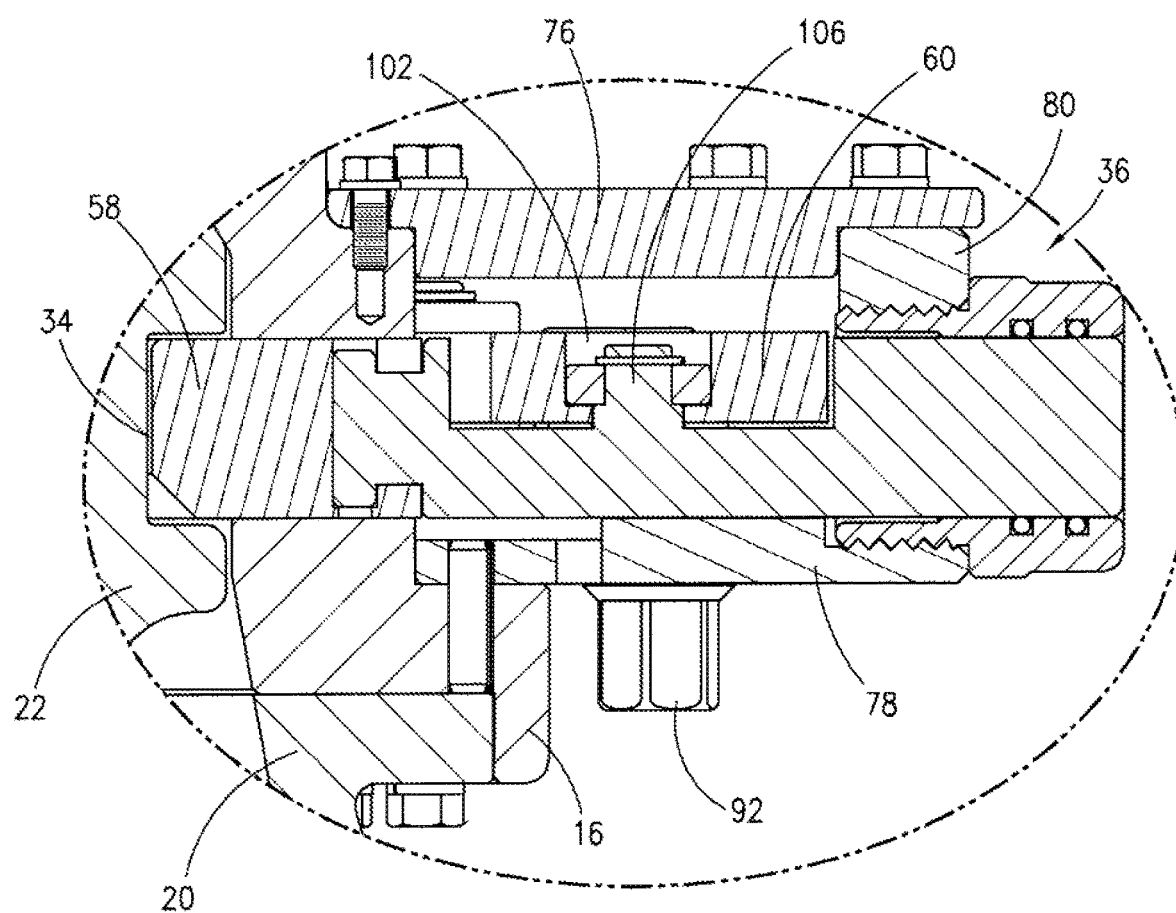
FIG. 7 is a cross-sectional view of a portion of the middle section of the connecting assembly taken from section 7 of FIG. 5.

With reference to FIGS. 4-7, FIG. 4 shows top sub 12 and bottom sub 12 in a non-stabbed position, and FIGS. 5-7 show top sub 12 as being stabbed onto bottom sub 14. As shown, latching assembly 18 may include a plurality of locking segments 58 within a compartment 74. Each of the plurality of locking segments 58 may include a vertically extending locking pin 106 (FIG. 7). Each locking pin 106 may be disposed through one of a plurality of apertures 102 in a locking ring 60 disposed in compartment 74. The latching assembly 18 may include locking ring actuating assemblies 38 positioned on the compartment 74 and extending therein. The locking ring actuating assemblies 38 may include a hydraulically actuated cylinder 108 and a piston 110. The piston 110 may include a distal end 112 (shown in FIG. 11) operatively connected to the shoulder 114 (shown in FIG. 11) of the locking ring 60. In some embodiments, hydraulic actuation of the locking ring actuating assemblies 38 may cause the locking ring 60 to selectively rotate from a non-activated position to an activated position and from the activated position to the non-activated position.

In some embodiments, such as shown in FIG. 5, when the top sub 12 is stabbed onto the bottom sub 14 and the locking ring actuating assemblies 38 have been rotated from the first non-activated position to the second activated position, the rotation of the locking ring actuating assemblies 38 may cause the locking pins 106 and attached locking segments 58 to radially move to a position wherein the locking segments 58 are engaged within a locking segment receipt section 34, between shoulders 30 and 32, of the mandrel 22 to operatively connect the bottom sub 14 within the top sub 12 in sealing engagement.

Compartment 74 may contain manual override assembly 92 which may be used to disengage the locking segments 58 engaged within the locking segment receipt section 34, between shoulders 30 and 32, of the mandrel 22 to operatively disconnect the bottom sub 14 from the sealing engagement within the top sub 12 in the case of a hydraulic failure. In some embodiments, the manual override assembly 92 disengages the locking segments 58 by disengaging a locking mechanism between the locking ring 60 and the locking pins 106.

FIGS. 5 and 7 show top sub 12 as being stabbed onto bottom sub 14. For example, the upper section 26 of mandrel 22 may positioned on shoulder 54 in the inner bore wall 56 of housing 16. Latching means 18 have been placed in their activated position such that locking segments 58 have been mechanically moved into position within locking segment receipt section 34, between shoulders 30 and 32, in mandrel 22. In this activated position, locking segments 58 radially contain bottom sub 14 in its connected position within top sub 12. Locking ring 60 is shown in its activated position wherein locking ring 60 mechanically prevents locking segments 58 from dislodging from locking segment receipt section 34 of mandrel 22, even if there is hydraulic failure.

As seen in FIG. 5 (also in FIG. 4), hydraulic safety bypass valve assembly 66 may be operatively connected to housing 16 and may be partially operatively positioned within access port 46. Hydraulic safety bypass valve assembly 66 functions to prevent the dislodging of locking segments 58 from locking segment receipt section 34 in mandrel 22 while there is wellbore pressure within the inner bore extending from housing 16 to mandrel 22. The wellbore pressure may be measured with a wellbore pressure sensor. A protection assembly 88 may be positioned about the safety bypass valve assembly 66.

As seen in FIG. 5, the mandrel 22 and connecting nut 24 both include an internal bore in communication. A sleeve 68 may be positioned on shoulder 52 of mandrel 22. Sleeve 68 may be a split ring. Sleeve 68 may be held in place by one or more set screws 70 extending through upper section 72 of connecting nut 24.

Also shown in FIG. 5, O-rings 28 may sealingly connect bottom sub 14 within top sub 12. For example, O-rings 28 may sealingly engage with the interior bore wall 56 of the top sub 12 housing 16 when the top sub 12 is stabbed onto the bottom sub 14. Connecting assembly 10 may also include quick test assembly 62 configured to the outer surface of housing 16 and in operative communication with test port 64 running through housing 16 and being positioned between O-rings 28. Quick test assembly 62 may indicate whether there is adequate sealing connection of bottom sub 14 within top sub 12. For example, when there are two O-rings 28, quick test assembly 62 may couple to an outer surface of the housing 16 in operative communication with the test port 64 extending through the housing 16 and positioned between the two O-rings 28, which may allow quick test assembly 62 via test port 64 to indicate an adequate sealing connection of the bottom sub 14 within the top sub 12.

Figure 8:
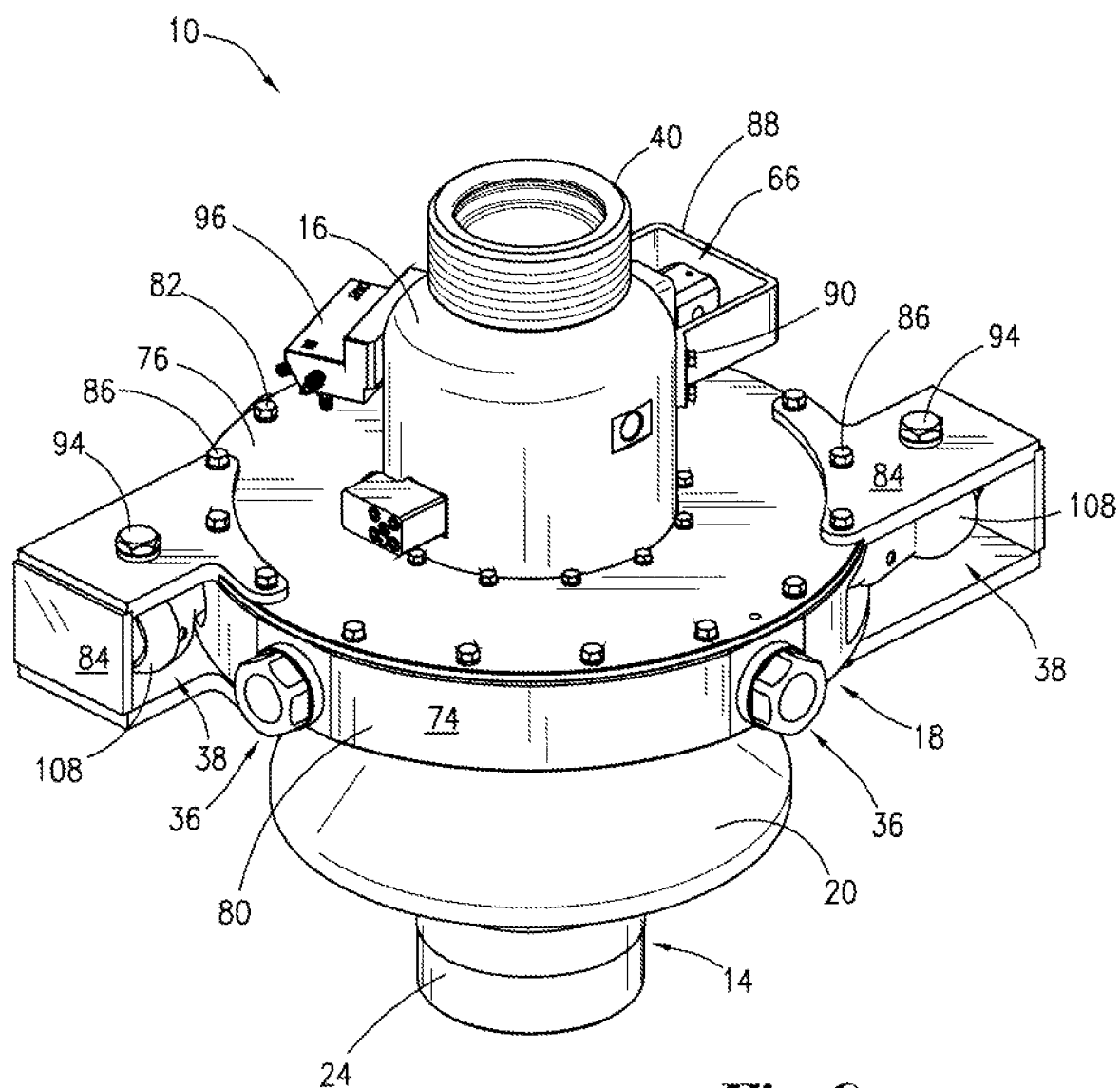
FIG. 8 is an isomeric view of the connecting assembly with the top sub positioned in stabbing arrangement with the bottom sub.

With further reference to FIGS. 6 and 8, which illustrates details of hydraulic locking ring actuating means 38, end cap 120 may be operatively affixed to cylinder 108. Bolts 94 are connected to cylinder 108 and provide for the stationary positioning of cylinder 108 relative to piston 110. Bolts 94 are shown connected through cylinder guard assemblies 84, which may serve to support or contain the hydraulic cylinder component 108 of hydraulic locking ring actuating means 38. Compartment 74 may include top plate 76 and bottom plate 78 interconnected by side section 80. Compartment 74 may be bolted together with bolts 82. Screws 156 (FIG. 14) may connect compartment 74 to housing 76. Mechanical locking segment assemblies 36 are positioned on and through side section 80. Hydraulic locking ring actuating means 38 are positioned on and through side section 80. Hydraulic locking ring actuating means 38 may be completely or partially covered by cylinder guard assembly 84. Guard assembly 84 may be integral with compartment 74 or may be detachably secured to compartment 74. For example, guard assembly 84 may be bolted to compartment 74, and more specifically bolted to top and bottom plates 76, 78 by bolts 86.

Figure 9:
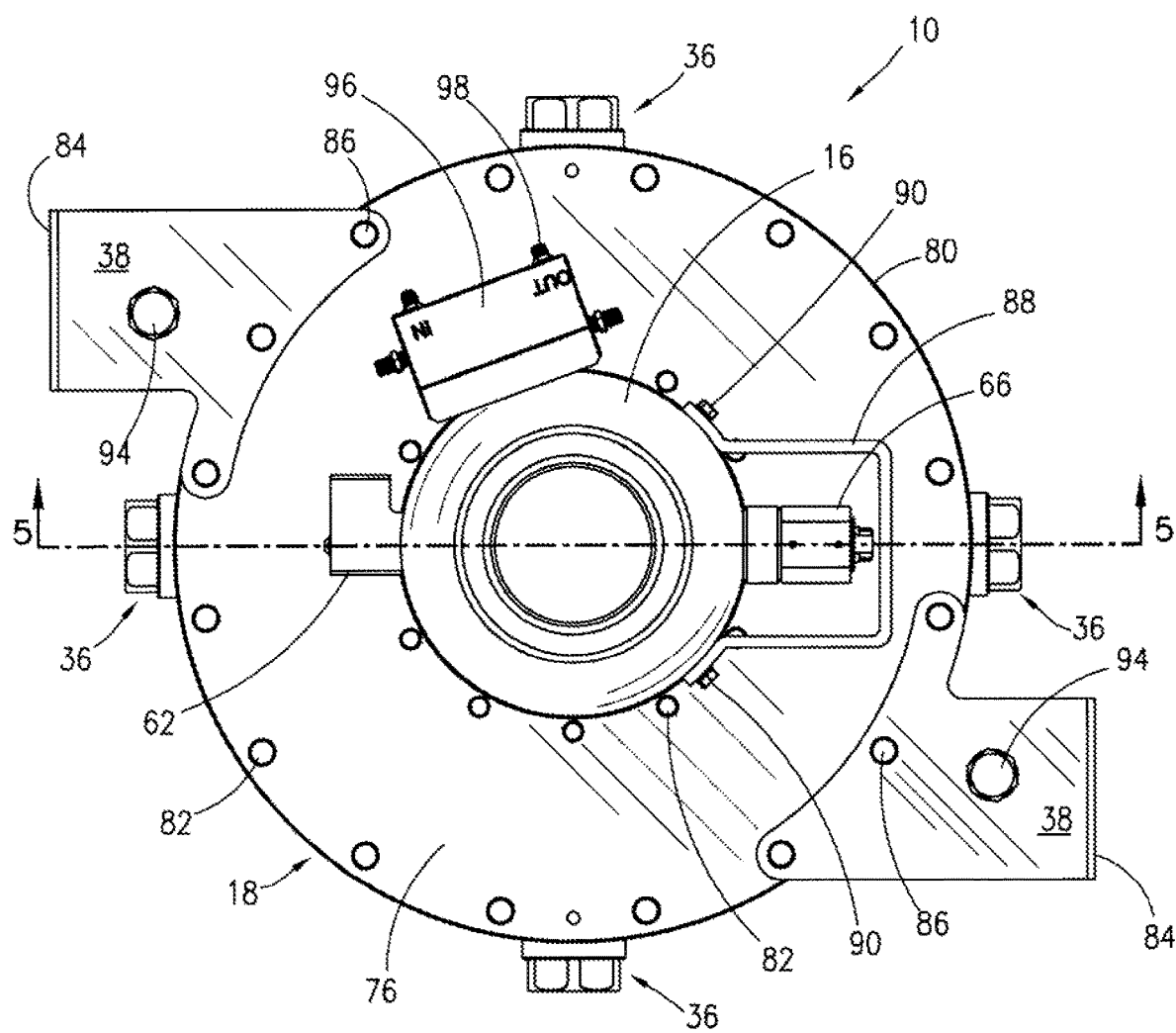
FIG. 9 is a top view of the connecting assembly showing a top view of the top sub.
Figure 10:
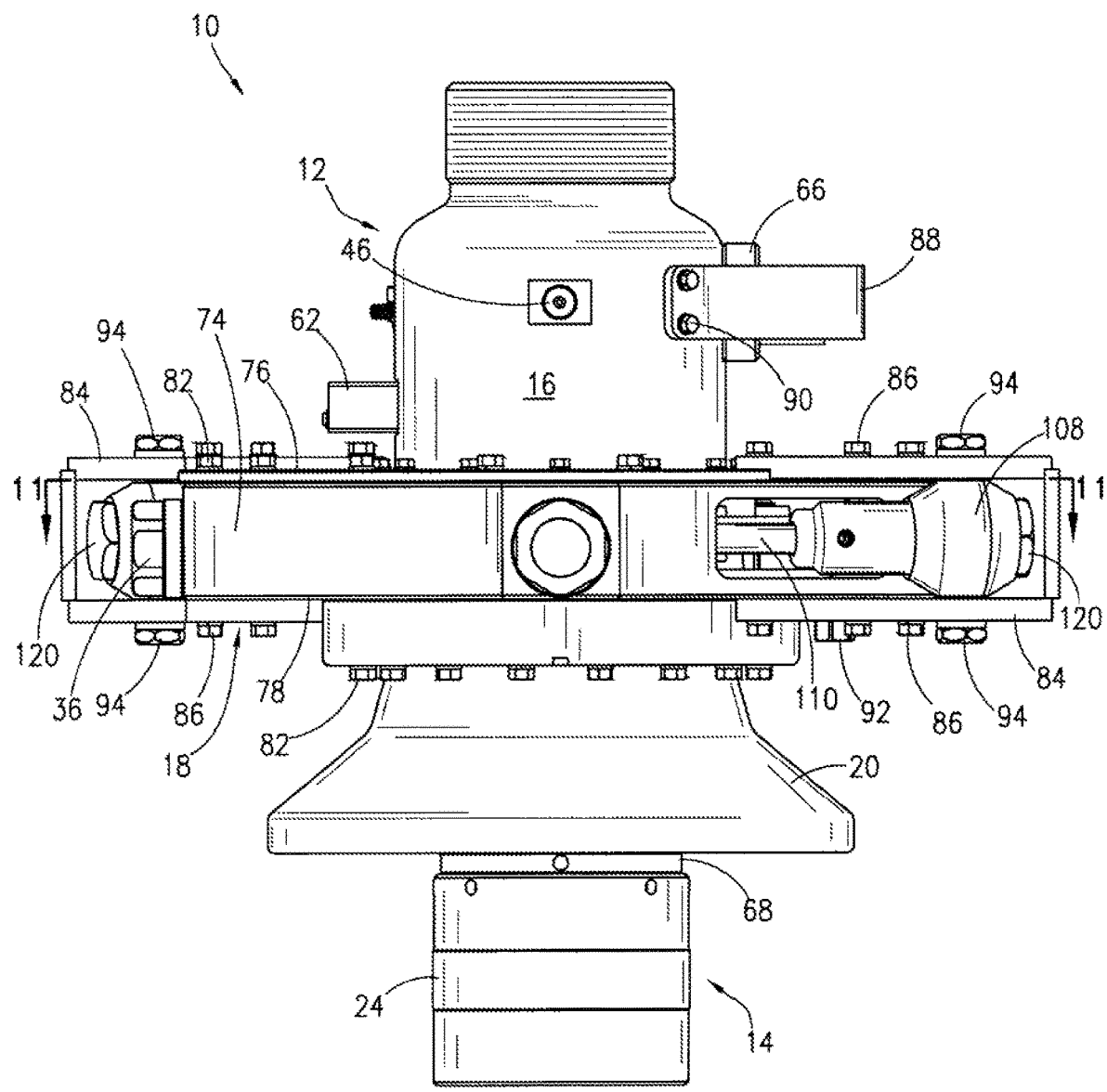
FIG. 10 is a side view of the connecting assembly with the top sub positioned in stabbing arrangement with the bottom sub.

As seen in FIGS. 8-10, latching means 18 are contained on and within compartment 74 of housing 16. Compartment 74 can be detachably secured to housing 16 or can be integral therewith. Compartment 74 may include top plate 76 and bottom plate 78 (not shown) interconnected by side section 80. Compartment 74 may be bolted together with bolts 82. Mechanical locking segment assemblies 36 and hydraulic locking ring actuating means 38 are shown positioned within compartment 74. Mechanical locking segment assemblies 36 are positioned on and through side section 80. Hydraulic locking ring actuating means 38 are positioned on and through side section 80. Hydraulic locking ring actuating means 38 may be completely or partially covered by cylinder guard assembly 84. Guard assembly 84 may be integral with compartment 74 or may be detachably secured to compartment 74. For example, guard assembly 84 may be bolted to compartment 74, and more specifically bolted to top and bottom plates 76, 78 by bolts 86.

With further reference to FIGS. 8-10, hydraulic safety bypass valve assembly 66 is shown positioned on and within top section 40 of housing 16. Protection assembly 88 is positioned about valve assembly 66. Protection assembly 88 may be made integral with housing 16 or may be detachably secured thereto. For example, protection assembly 88 may be bolted to housing 16 via bolts 90.

Again with reference to FIGS. 8-10, hydraulic manifold 96 is shown connected to top section 40 of housing 16. Manifold 96 may be made integral with housing 16 or may be detachably secured thereto. Hydraulic manifold 96 may contain entry and exit lines for the hydraulic fluid as well as valves controlling the flow and pressure of the hydraulic fluid through connecting assembly 10. For example, manifold 96 may include backflow prevention valve 98.

Figure 11:
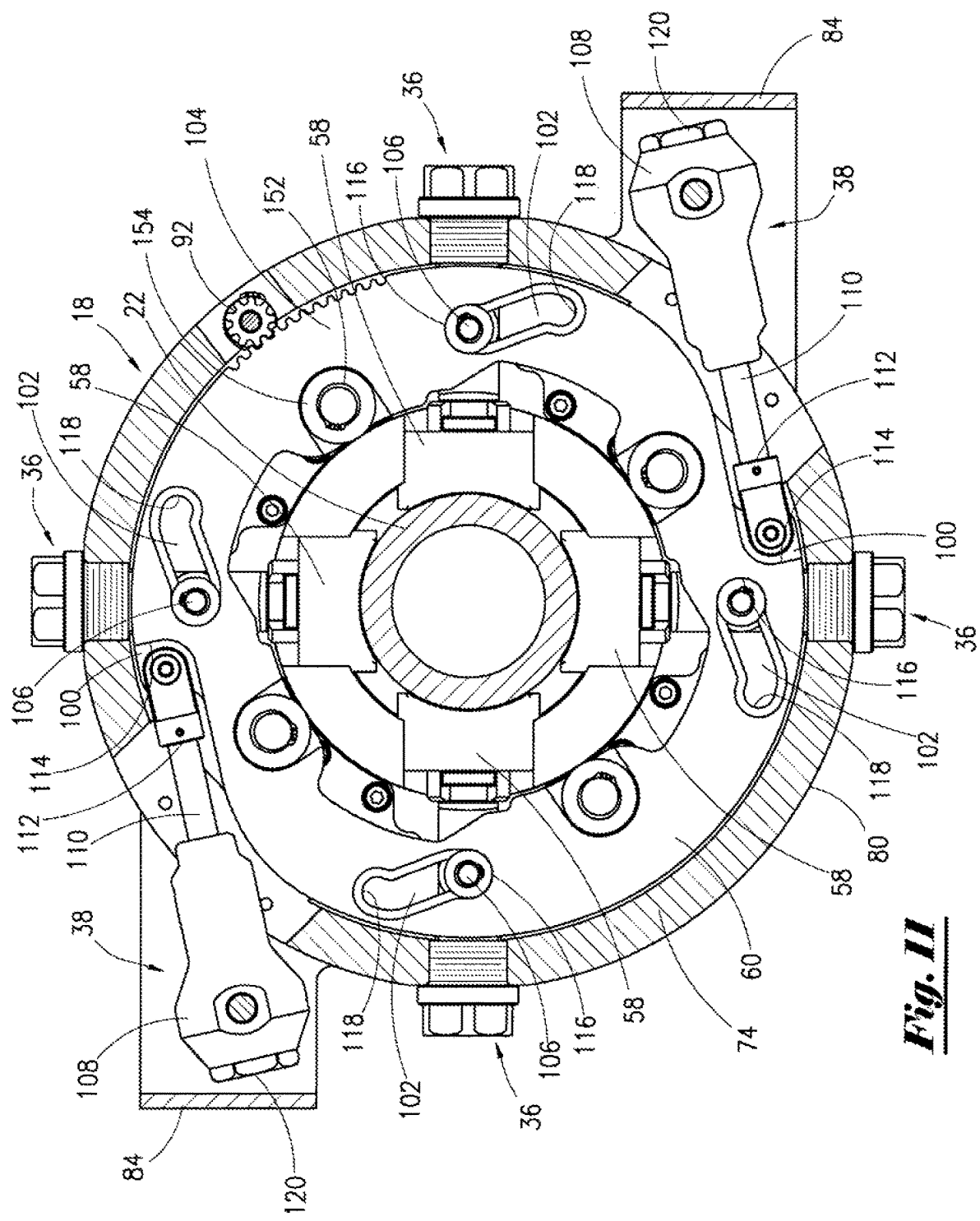
FIG. 11 is a cross-sectional view taken through line 11-11 of FIG. 10 of the middle section of the connecting assembly in the stabbed position.
Figure 12:
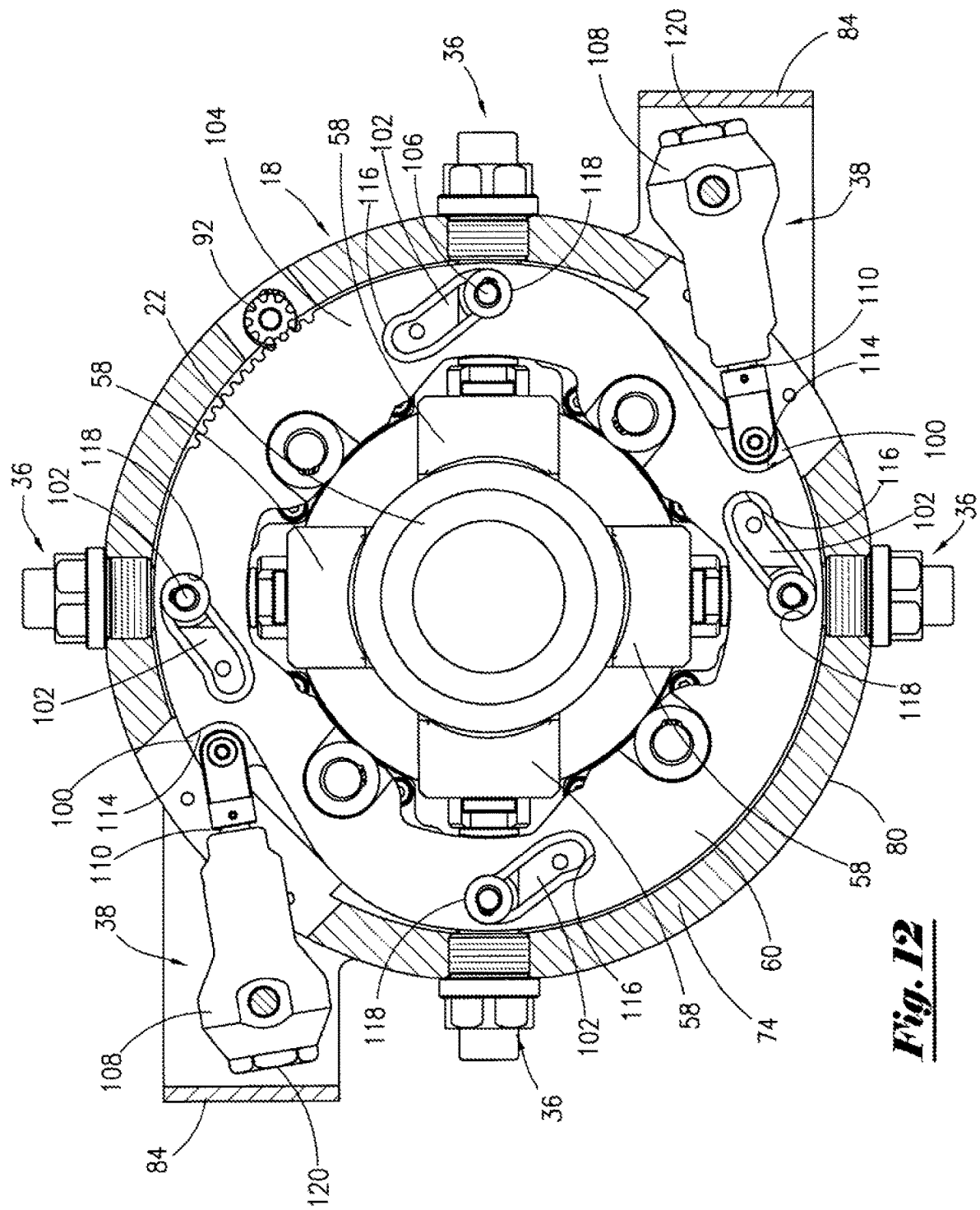
FIG. 12 is a cross-sectional view taken through line 12-12 of FIG. 1 of the middle section of the connecting assembly in the non-stabbed position.
Figure 13:
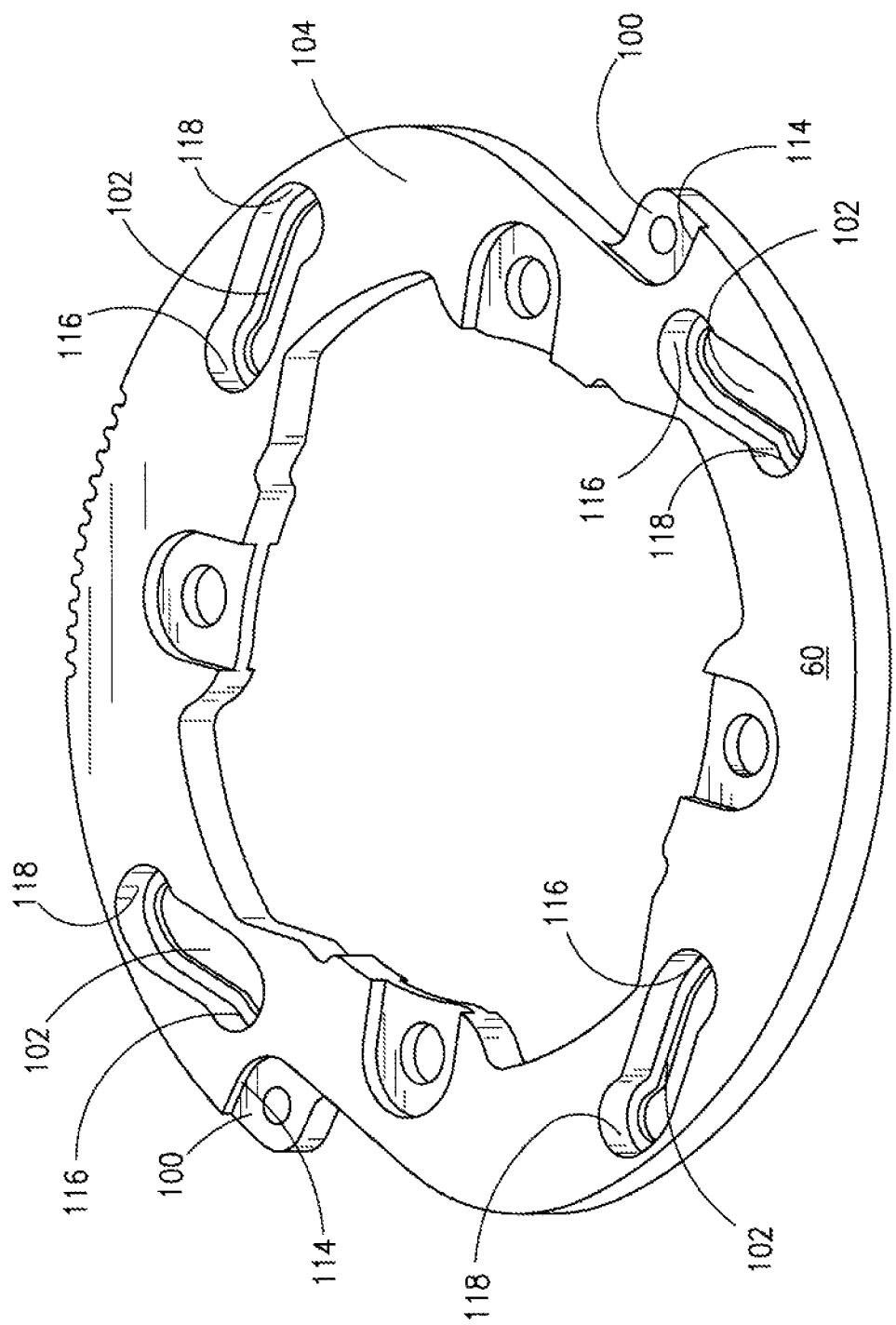
FIG. 13 is an isomeric view of a locking ring of the connecting assembly.

With reference to FIGS. 11-13, locking ring 60 may be positioned within the interior of compartment 74 and circumferentially surrounding the outer surface of housing 16. Connectors 152 and 154 (e.g., nuts, washers, and the like) may be used to secure locking ring 60 within compartment 74. The outer side surface of locking ring 60 contains a series of L-shaped recesses or cutouts 100 configured to accommodate the piston of hydraulic locking ring actuating means 38 such that actuation of hydraulic locking ring actuating means 38 radially moves locking ring 60 from a non-activated position to an activated position to provide the mechanical locking means for mechanical locking segment assemblies 36, such as in the event that hydraulic pressure is lost or diminished.

Locking ring 60 also contains a series of Cam-shaped apertures or recesses 102 in top surface 104 of locking ring 60 through which locking pins 106 are disposed. Locking pins 106 are operatively connected to locking segment assemblies 36. Movement of the locking ring 60 from the non-activated position (FIG. 12) to the activated position (FIG. 11) causes locking pins 106 to spatially move towards housing 16 thereby reciprocating locking segment assemblies 36 towards the bottom sub 14 such that segments 58 are positioned and engaged within locking segment receipt section 34, between shoulders 30 and 32, of mandrel 22. Segments 58 are held in the engaged position even in the event of a loss of hydraulic fluid affecting hydraulic locking ring actuating means 38. Movement of locking ring 60 from the activated position (FIG. 11) to the non-activated position (FIG. 12) causes locking pins 106 to radially move away from housing 16 thereby reciprocating locking segment assemblies 36 away from bottom sub 14 such that segments 58 are disengaged from locking segment receipt section 34 of mandrel 22.

With reference to FIGS. 11-13, the arrangement of latching means 18 within compartment 74 is shown. As shown, hydraulic locking ring actuating means 38 each include cylinder 108 and piston 110. The distal end 112 of piston 110 is operatively connected to shoulder 114 in locking ring 60. Actuation of piston 110 will cause movement of locking ring 60 from the non-activated position (FIG. 12) to the activated position (FIG. 11). Locking ring 60 may be placed in the activated position such that locking segments 58 of locking segment assemblies 36 are engaged within the locking segment receipt section 34, between shoulders 30 and 32, of mandrel 22. Accordingly, locking pins 106 are positioned at the bottom 116 of aperture 102 in a position closer to housing 16 (FIG. 11).

In the non-activated position of locking ring 60, locking pins 106 may be placed at top 118 of aperture 102 in a position away from housing 16 (FIG. 12). Accordingly, as locking ring 60 rotationally moves vis-à-vis actuation of piston 110 from its non-activated position wherein locking pins 106 are placed at top 118 of aperture 102 to the activated position wherein locking pins 106 are placed at bottom 116 of aperture 102, movement of locking ring 60 causes sliding radial movement of locking segment assemblies 36 from a non-engaged position (FIG. 12) to an engaged position (FIG. 11) whereby segments 58 are positioned within locking segment receipt section 34 of mandrel 22 to connect top sub 12 to bottom sub 14. As locking ring 60 rotationally moves or retracts vis-à-vis actuation of piston 110 in the opposite direction from the activated position to the non-activated position, movement of locking ring 60 causes sliding radial movement of locking segment assemblies 36 from the engaged position (FIG. 12) to the non-engaged position (FIG. 12) whereby segments 58 are disengaged from locking segment receipt section 34 of mandrel 22 thereby permitting disconnection of bottom sub 14 from top sub 12.

Figure 14:
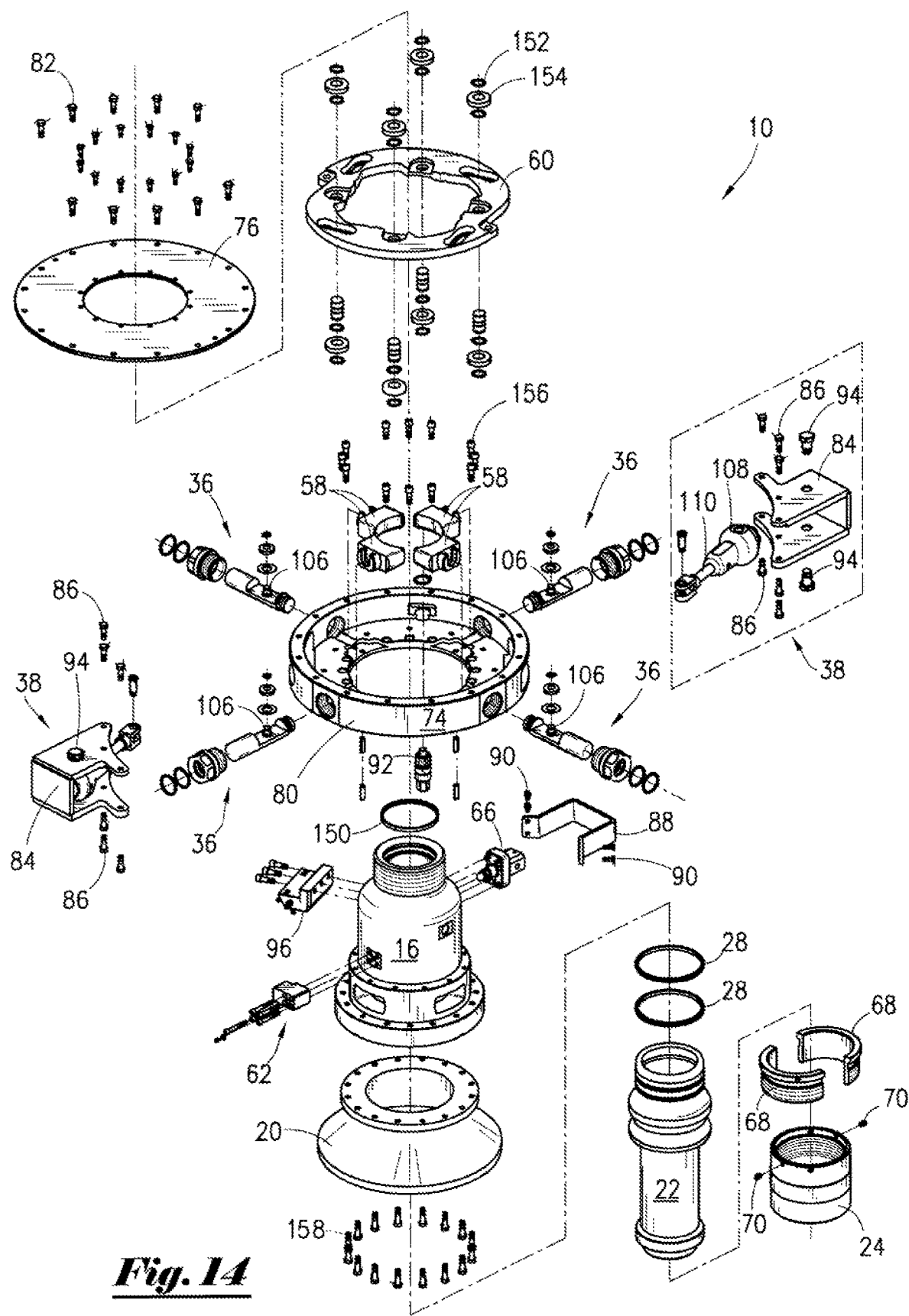
FIG. 14 is an exploded view of the connecting assembly showing exploded views of the top sub and the bottom sub.

FIG. 14 illustrates an exploded view of the non-limiting exemplary components of the connecting assembly 10, as described herein.

Figure 15:
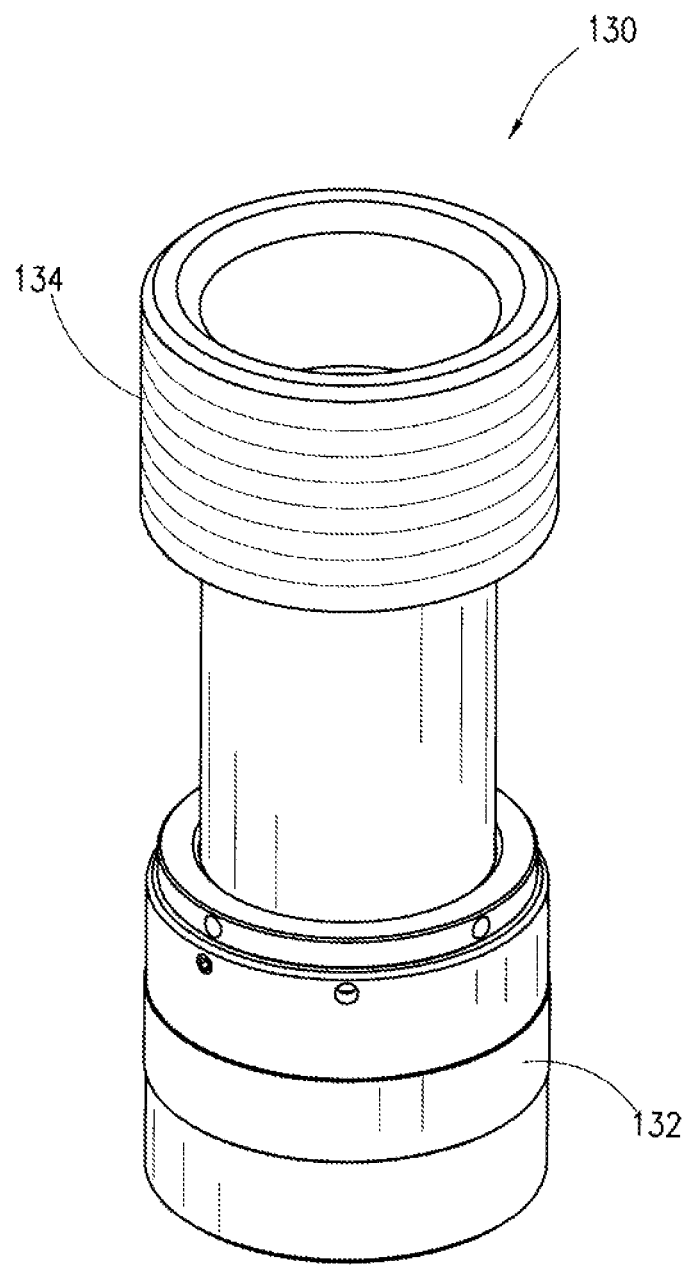
FIG. 15 is a perspective view of an embodiment of an adapter.

As shown in FIG. 15, top section 40 of top sub 12 may be connectable to one or more adapters, such as to lower section 132 of adapter 130, which may then connect to the wellbore tool or equipment via the upper section 134 of adapter 130. Adapters 130 may be used depending on the inner diameter to the wellbore tool or equipment. For example, where the inner diameter of the wellbore tool or equipment is sized to fit onto top sub 12, no adapter is required, but if the inner diameter of the wellbore tool or equipment is sized larger or smaller so as not to fit onto top sub 12, an adapter 130 may be required to make the connection between the wellbore tool or equipment and the top sub 12.

Figure 16:
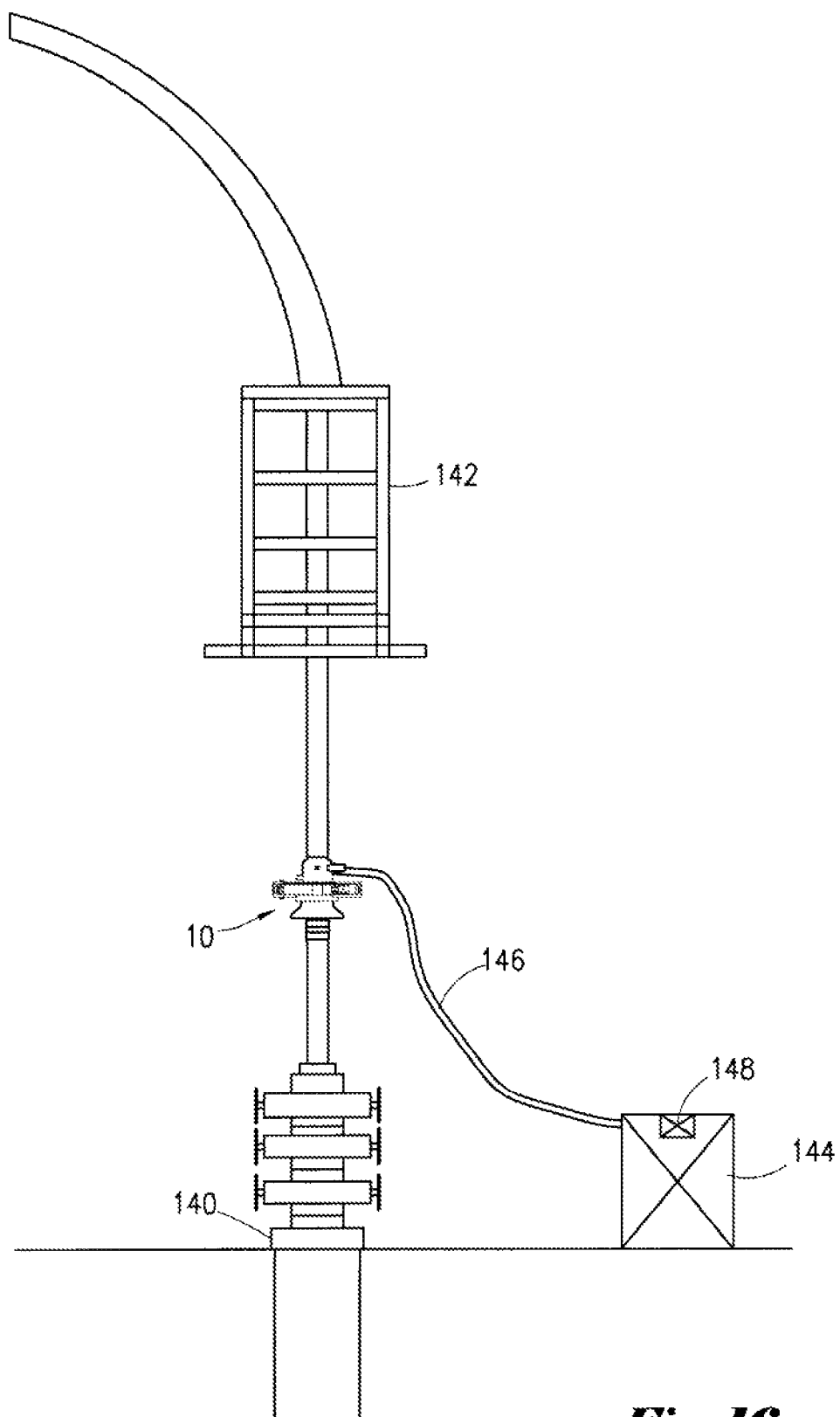
FIG. 16 illustrates a schematic of the connecting assembly fixed on a wellhead and attached to a tool.

FIG. 16 illustrates a schematic of the connecting assembly 10 in operation. Top section 40 of housing 16 of top sub 12 is operatively connected to wellbore equipment or tool 142 (e.g., wireline or coiled tubing equipment or tool). To sub 12 is being lowered for stabbing onto bottom sub 14. Bottom sub 14 is operatively connected to wellhead 140. Control unit 144 may be operated by personnel to activate the locking ring actuating means 38 to move the locking ring 60 between the non-activated position and the activated position, whereby the locking segments 58 are radially placed into engagement with the bottom sub 14. The control unit 144 includes one or more hydraulic lines 146 operatively connected to the connecting assembly 10, and the activation of the connecting assembly 10 may be via use of these lines 146. In some embodiments the control unit 144 may include a wellbore pressure sensor 148 configured to provide a pressure measurement associated with the internal bore. In some embodiments, the sensor 146 may be directly coupled to the connecting assembly 10. As shown, guide 20 may act as a reentry guide assembly configured to receive the tool 142.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A connecting assembly comprising:
a top sub including a housing with an interior bore wall, the housing including an upper section, a middle section, and a lower section, the upper section configured for detachable fixation to a first wellbore tool, the middle section including a latching assembly, the lower section including a guide member;
a bottom sub including a mandrel and a connecting nut, the mandrel including an upper section with one or more sealing means, a first shoulder and a second shoulder spaced apart by a locking segment receipt section, and a lower section including a third shoulder, the lower section configured for detachable fixation to the connecting nut, the connecting nut including an upper section detachably affixed to the lower section of the mandrel and a lower section configured for detachable fixation to a wellhead or to a second wellbore tool, the mandrel and connecting nut both including an internal bore in communication;
wherein the guide member has an upper section affixed to the lower section of the housing and a lower section configured to receive the upper section of the mandrel when the top sub is stabbed onto the bottom sub, the lower section of the guide member having an enlarged inner diameter in relation to the inner diameter of the upper section of the guide member;
wherein the latching assembly includes a compartment containing a locking ring having a top surface, a bottom surface, and an interconnecting side surface, the side surface including a plurality of L-shaped recesses terminating in a shoulder of the locking ring, the locking ring including a plurality of apertures extending from the top surface to the bottom surface;
wherein the latching assembly further includes a plurality of locking segments within the compartment, each of the plurality of locking segments including a vertically extending locking pin, each locking pin being disposed through one of the plurality of apertures in the locking ring;
wherein the latching assembly further includes one or more locking ring actuating assemblies positioned on the compartment and extending therein, each of the one or more locking ring actuating assemblies including a hydraulically actuated cylinder and a piston, the piston including a distal end operatively connected to the shoulder of the corresponding locking ring such that hydraulic actuation of the locking ring actuating assemblies causes the locking ring to selectively rotate from a first non-activated position to a second activated position and from the second activated position to the first non-activated position; and
wherein when the top sub has been stabbed onto the bottom sub and the locking ring actuating assemblies have been rotated from the first non-activated position to the second activated position, the rotation of the locking ring actuating assemblies causes the locking pins and attached locking segments to radially move to a position wherein the locking segments are engaged within the locking segment receipt section of the mandrel to operatively connect the bottom sub within the top sub in sealing engagement.

2. The connecting assembly of claim 1, wherein the plurality of apertures are cam-shaped.

3. The connecting assembly of claim 1, wherein each of the plurality of apertures comprises a top portion and a bottom portion, wherein the locking pins are disposed at the top portion of the aperture in the first non-activated position, and the locking pins are disposed at the bottom portion of the aperture in the second activated position.

4. The connecting assembly of claim 3, wherein the bottom portion of each aperture is spatially closer to the housing than the top portion of each aperture.

5. The connecting assembly of claim 1, wherein a second rotation of the locking ring actuating assemblies causes the locking pins and attached locking segments to radially move to a second position wherein the locking segments that are engaged within the locking segment receipt section are disengaged within the locking segment receipt section of the mandrel to operatively disconnect the bottom sub from the sealing engagement within the top sub.

6. The connecting assembly of claim 1, wherein the guide member has a tapered shape from the enlarged inner diameter of the lower section of the guide member to the inner diameter of the upper section of the guide member.

7. The connecting assembly of claim 1, wherein an outer side surface of the locking ring contains one or more cutouts, each cutout configured to receive a corresponding one of the pistons.

8. The connecting assembly of claim 1, further comprising one or more cylinder guard assemblies connected to top and bottom portions of the compartment.

9. The connecting assembly of claim 8, wherein each cylinder guard assembly is affixed to the top and bottom portions of the compartment via attachment means.

10. The connecting assembly of claim 8, wherein each cylinder guard assembly is integrally formed with the top and bottom portions of the compartment.

11. The connecting assembly of claim 8, wherein each cylinder guard assembly is configured to house one of the hydraulically actuated cylinders and one of the pistons.

12. The connecting assembly of claim 1, wherein the guide member comprises a reentry guide assembly configured to receive a wireline tool.

13. The connecting assembly of claim 1, wherein the locking pins are coupled to locking segment assemblies that extend outward from the housing in a radial direction.

14. The connecting assembly of claim 1, further comprising a control unit configured to activate the locking ring actuating assemblies to move the locking ring from the first non-activated position to the second activated position.

15. The connecting assembly of claim 14, wherein the control unit comprises one or more hydraulic lines operatively connected to the connecting assembly and the activation is via the one or more hydraulic lines.

16. The connecting assembly of claim 1, further comprising a wellbore pressure sensor configured to provide a pressure measurement associated with the internal bore.

17. The connecting assembly of claim 1, wherein the rotation of the locking actuating assemblies is responsive to hydraulic force inside the internal bore in the range of about 800 to about 1000 psi to move the locking ring from the non-activated position to the activated position.

18. The connecting assembly of claim 1, further comprising one or more O-rings disposed on the upper outer surface of the mandrel.

19. The connecting assembly of claim 18, wherein the mandrel comprises one or more recesses each configured to receive placement of a corresponding one of the one or more O-rings.

20. The connecting assembly of claim 18, wherein the one or more O-rings sealingly engage with the interior bore wall of the top sub housing when the top sub is stabbed onto the bottom sub.

21. The connecting assembly of claim 18, wherein the one or more O-rings comprise two 0-rings, and the connecting assembly further comprises a quick test assembly coupled to an outer surface of the housing in operative communication with a test port extending through the housing and positioned between the two O-rings, wherein the quick test assembly is configured to indicate an adequate sealing connection of the bottom sub within the top sub.

22. The connecting assembly of claim 1, wherein the nut includes a sleeve situated on an inner surface of the nut and placed within the internal bore.

23. The connecting assembly of claim 22, wherein the sleeve is connected to the inner surface of the nut via connecting means.

24. The connecting assembly of claim 22, wherein the sleeve is a split ring assembly.

25. The connecting assembly of claim 1, further comprising a safety bypass valve assembly positioned on and within the upper section of the housing of the top sub, wherein the safety bypass value assembly is configured to prevent dislodging of the locking segments from the locking segment receipt stations while there is wellbore pressure within the inner bore wall.

26. The connecting assembly of claim 25, further comprising a protection assembly positioned about the safety bypass valve assembly.

27. The connecting assembly of claim 1, wherein the compartment further includes a manual override assembly configured to disengage the locking segments engaged within the locking segment receipt section of the mandrel to operatively disconnect the bottom sub from the sealing engagement within the top sub in the case of a hydraulic failure.

28. The connecting assembly of claim 27, wherein the manual override assembly disengages the locking segments by disengaging a locking mechanism between the locking ring and the locking pins.

29. The connecting assembly of claim 1, further comprising a hydraulic manifold assembly connected to the housing, wherein the hydraulic manifold assembly includes an entry line and an exit line for hydraulic fluid, and the hydraulic manifold assembly further includes one or more valves for controlling a flow, a pressure, or a backflow of the hydraulic fluid.

30. The connecting assembly of claim 1, wherein in the second activated position, the locking ring maintains the operative connection of the bottom sub within the top sub in sealing engagement despite a loss of hydraulic force.

31. The connecting assembly of claim 1, further comprising an adapter device configured to connect to the top section of the housing, wherein the adapter is based on an inner diameter of the first wellbore tool, wherein the adapter couples the wellbore tool to the housing.

32. A method for operating a connecting assembly comprising the steps of:
a) providing a top sub including a housing with an interior bore wall, the housing including an upper section, a middle section, and a lower section, the upper section configured for detachable fixation to a first wellbore tool, the middle section including a latching assembly, the lower section including a guide member; a bottom sub including a mandrel and a connecting nut, the mandrel including an upper section with one or more sealing means, a first shoulder and a second shoulder spaced apart by a locking segment receipt section, and a lower section including a third shoulder, the lower section configured for detachable fixation to the connecting nut, the connecting nut including an upper section detachably affixed to the lower section of the mandrel and a lower section configured for detachable fixation to a wellhead or to a second wellbore tool, the mandrel and connecting nut both including an internal bore in communication; wherein the guide member has an upper section affixed to the lower section of the housing and a lower section configured to receive the upper section of the mandrel when the top sub is stabbed onto the bottom sub, the lower section of the guide member having an enlarged inner diameter in relation to the inner diameter of the upper section of the guide member; wherein the latching assembly includes a compartment containing a locking ring having a top surface, a bottom surface, and an interconnecting side surface, the side surface including a plurality of L-shaped recesses terminating in a shoulder of the locking ring, the locking ring including a plurality of apertures extending from the top surface to the bottom surface; wherein the latching assembly further includes a plurality of locking segments within the compartment, each of the plurality of locking segments including a vertically extending locking pin, each locking pin being disposed through one of the plurality of apertures in the locking ring; wherein the latching assembly further includes one or more locking ring actuating assemblies positioned on the compartment and extending therein, each of the one or more locking ring actuating assemblies including a hydraulically actuated cylinder and a piston, the piston including a distal end operatively connected to the shoulder of the corresponding locking ring such that hydraulic actuation of the locking ring actuating assemblies causes the locking ring to selectively rotate from a first non-activated position to a second activated position and from the second activated position to the first non-activated position; and wherein when the top sub has been stabbed onto the bottom sub and the locking ring actuating assemblies have been rotated from the first non-activated position to the second activated position, the rotation of the locking ring actuating assemblies causes the locking pins and attached locking segments to radially move to a position wherein the locking segments are engaged within the locking segment receipt section of the mandrel to operatively connect the bottom sub within the top sub in sealing engagement;

b) stabbing the top sub onto the bottom sub; and c) causing, responsive to the stabbing, rotation of the locking ring from the first non-activated position to the second activated position and from the second activated position to the first non-activated position by causing rotation of the locking ring actuating assemblies to cause the locking pins and attached locking segments to radially move to a position wherein the locking segments are engaged within the locking segment receipt section of the mandrel to operatively connect the bottom sub within the top sub in sealing engagement.

33. The method of claim 32, further comprising causing a second rotation of the locking ring actuating assemblies to cause the locking pins and attached locking segments to radially move to a second position wherein the locking segments that are engaged within the locking segment receipt section are disengaged within the locking segment receipt section of the mandrel to operatively disconnect the bottom sub from the sealing engagement within the top sub.

* * * * *